(12) United States Patent
Gotsmann et al.

(10) Patent No.: US 8,053,067 B2
(45) Date of Patent: Nov. 8, 2011

(54) DATA STORAGE DEVICE AND METHOD OF PRODUCTION THEREFOR

(75) Inventors: Bernd W. Gotsmann, Horgen (CH); Armin W. Knoll, Adliswil (CH); Urs T. Duerig, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 12/061,144

(22) Filed: Apr. 2, 2008

(65) Prior Publication Data

US 2008/0212456 A1   Sep. 4, 2008

Related U.S. Application Data

(63) Continuation of application No. 11/740,829, filed on Apr. 26, 2007, now abandoned.

(30) Foreign Application Priority Data

May 30, 2006   (EP) .................................... 06114798

(51) Int. Cl.
*B32B 7/02* (2006.01)
(52) U.S. Cl. ...... 428/220; 428/64.1; 428/64.4; 428/212; 369/283; 369/288

(58) Field of Classification Search ................. 428/64.1, 428/64.4, 220, 212; 369/283, 288
See application file for complete search history.

(56) References Cited

U.S. PATENT DOCUMENTS

| | | | |
|---|---|---|---|
| 5,382,463 A * | 1/1995 | Adkins et al. ................. | 428/141 |
| 5,835,477 A * | 11/1998 | Binnig et al. ................. | 369/126 |
| 6,716,505 B2 * | 4/2004 | Dris et al. .................... | 428/64.1 |
| 6,893,700 B2 | 5/2005 | Dris et al. | |
| 7,029,742 B2 | 4/2006 | Dris et al. | |
| 7,314,658 B2 | 1/2008 | Dris et al. | |
| 7,522,511 B2 | 4/2009 | Gotsmann et al. | |

OTHER PUBLICATIONS

Internet Article "Polymer Chemistry—The Glass Transition", web address http://www.lasalle.edu/academ/chem/ms/polymersRus/Resources/glassTrans.htm, dated Apr. 3, 2009, 3 pages.

\* cited by examiner

*Primary Examiner* — David Sample
*Assistant Examiner* — Lawrence Ferguson
(74) *Attorney, Agent, or Firm* — Cantor Colburn LLP

(57) ABSTRACT

The present invention relates to a data storage device comprising: a data storage medium for storing data in the form of topographic features; and at least one probe for writing and/or reading the data stored in the data storage medium, wherein the data storage medium is formed on a support layer, the support layer having a lower shear modulus than the data storage medium.

11 Claims, 4 Drawing Sheets

DATA STORAGE DEVICE AND METHOD OF PRODUCTION THEREFOR

CROSS REFERENCE TO RELATED APPLICATIONS

This application is a continuation application of U.S. Ser. No. 11/740,829 filed Apr. 26, 2007, now abandoned, the contents of which are incorporated by reference herein in their entirety.

FIELD OF THE INVENTION

The present invention relates to a data storage device and particularly to a data storage device such as a thermomechanical probe storage device. The present invention also extends to a method of producing such a data storage device.

BACKGROUND OF THE INVENTION

A data storage device based on the atomic force microscope (AFM) is disclosed in "The millipede—more than 1,000 tips for future AFM data storage" by P. Vettiger et al., IBM Journal Research Development, Vol. 44, No. 3, March 2000. The storage device has a read and write function based on a mechanical x-, y-scanning of a storage medium with an array of probes each having a tip. The probes operate in parallel with each probe scanning, during operation, an associated field of the storage medium. The storage medium comprises a polymethylmethacrylate (PMMA) layer. The tips, which each have a diameter of between 5 nm to 40 nm, are moved across the surface of the polymer layer in a contact mode. The contact mode is achieved by applying forces to the probes so that the tips of the probes can touch the surface of the polymer layer. For this purpose, the probes comprise cantilevers, which carry the tips on their end sections. Bits are represented by indentation marks, each encoding a logical "1", or non-indentation marks, each encoding a logical "0", in the polymer layer. The cantilevers respond to these topographic changes while they are moved across the surface of the polymer layer during operation of the device in read/write mode.

Indentation marks are formed on the polymer layer by thermomechanical recording. This is achieved by heating the tip of a respective probe operated in contact mode with respect to the polymer layer. Heating of the tip is achieved via a heater dedicated to the writing/formation of the indentation marks. The polymer layer softens locally where it is contacted by the heated tip. The result is an indentation mark, for example, having a nanoscale diameter comparable to the diameter of the tip that is used in its formation, being produced on the layer.

Reading is also accomplished by a thermomechanical concept. For this purpose a heater dedicated to the process of reading/sensing the indentation marks is energized. The heater is thermally decoupled from the tip of the probe. Accordingly, softening of the polymer layer does not occur where it is contacted by the tip during reading. The thermal sensing is based on the fact that the thermal conductance between the heater and the storage medium changes when the probe is moving in an indentation mark as the heat transport is in this case more efficient. As a consequence of this, the temperature of the cantilever decreases and hence, also its electrical resistance changes. This change of electrical resistance is then measured and serves as the readback signal.

The configuration in which previously-proposed devices are formed is that the data storage medium, usually a polymer layer, is formed on a substrate that has a comparably higher shear modulus. FIGS. 1a and 1b in the accompanying drawings respectively show examples of such previously-proposed data storage devices. In FIG. 1a, a data storage medium 3 comprising a polymer layer is deposited onto a silicon substrate 4. The device of FIG. 1b differs from that of FIG. 1a in that the data storage medium 3 is deposited onto a secondary layer 5 that has a higher shear modulus than the polymer material of the data storage medium 3. The secondary layer 5 may, for example, be SU8 that is provided on the silicon substrate 4. A role of the secondary layer 5 could be seen as preventing penetration of the tip, which is used to produce indentation marks on the polymer layer, through the polymer layer since this would cause contact between the tip and the silicon substrate 4 and, therefore, tip wear.

The geometry of the indentation marks produced in the polymer layer may play a role in determining a data density (the number of bits per unit area) and, therefore, a data storage capacity, of the above-described data storage devices. In particular, when an indentation mark is formed in the polymer layer, polymer material is displaced from where the indentation mark is formed and deposited onto the region surrounding the opening thereof, thereby forming a rim around the indentation mark. Rim formation around indentation marks may limit the data density, this especially being the case when the distance between the bits is reduced to, for example, 20 nm, in order to increase a storage capacity of the data storage device. Furthermore, the rim formation also affects the readback signal obtained during the read operation since the height of the surface between adjacent bits, i.e. where a non-indentation mark is present/logical "0" is encoded, is increased relative to what is obtained for an indentation mark. Thus, the noise associated to the non-indentation marks or logical 0's may be increased, which causes lowering of the signal-to-noise (SNR) ratio.

Accordingly, it is desirable to provide a data storage device in which rim formation around an indentation mark is reduced compared to what is obtained in previously-proposed data storage devices.

SUMMARY OF THE INVENTION

According to an embodiment of a first aspect of the present invention, there is provided a data storage device comprising: a data storage medium for storing data in the form of topographic features; and at least one probe for writing and/or reading the data stored in the data storage medium, wherein the data storage medium is formed on a support layer, the support layer having a lower shear modulus than the data storage medium. The mechanical stress field that is created in the data storage medium where an indentation mark is written thereon by way of a tip is absorbed by the support layer by virtue of the latter having a lower shear modulus than the data storage medium. Accordingly, since the back-action of the mechanical stress field is, in this case, reduced, rim formation around an opening of an indentation mark is reduced compared to what is obtained with previously-proposed data storage devices.

Preferably, the data storage medium comprises a layer of poly-aryletherketone, PAEK. PAEK is a polymer that demonstrates stability when exposed to elevated temperatures such as, for example, those used to heat a tip for writing data thereon. PAEK has a shear modulus of about 3 to 5 GPa.

Desirably, the shear modulus of the support layer is <1 GPa. By using a support layer that has a shear modulus that is <1 GPa, the mechanical stress field that is created in and around the region of the data storage medium that is contacted by a tip when data is written thereon, is transmitted and spread in the support layer in a direction parallel to the surface of the data storage medium over a region that is much wider than the tip diameter. Thus, the back-action of the mechanical stress field is reduced and so the formation of rims is also reduced compared to previously-proposed data storage devices.

Preferably, a thickness of the data storage medium is at least 5 nm. When the thickness of the data storage medium is in the range of 5 nm to 20 nm, for example, the proximity of the tip that is used in the production of an indentation mark in such a medium relative to the support layer is increased than if a thicker layer were used for the data storage medium. In this case, the mechanical stress field is absorbed more by the support layer, rather than material of the data storage medium at an increasing depth in the axis of tip penetration which would be the case for thicker layers of the data storage medium, and, thus, rim suppression would be expected to be enhanced Desirably, the support layer comprises a polymer material having a glass transition temperature that is lower than room temperature. Since the viscosity of the polymer material used for the support layer has a glass transition temperature lower than room temperature, it would react to the mechanical stress field created in the data storage medium, when an indentation mark is formed thereon by way of a tip, by yielding and/or flowing. Accordingly, the back-action of the mechanical stress field and the formation of a rim around the indentation mark would be reduced.

Alternatively, the support layer comprises a polymer material having a glass transition temperature >60° C. In this case, it is desirable that the support layer comprises a polymer material having a glass transition temperature lower than that of the data storage medium. The support layer mechanically deforms when an indentation mark is produced in the data storage medium. The support layer is able to preserve its mechanically deformed state at room temperature, which is the temperature at which an embodiment of the present invention may be typically operated, by virtue of being made up of a polymer material having a glass transition temperature >60° C. Furthermore, the support layer is chosen so as to comprise a polymer material having a glass transition temperature lower than that of the data storage medium. When an indentation mark is formed in the data storage medium, the data storage medium where contacted by the tip and an underlying region in the support layer are deformed. The heat and/or force used to produce the indentation by way of the tip depend on the glass transition temperature of the data storage medium and the support layer, respectively. In an embodiment of the present invention, since the support layer is chosen so as to comprise a polymer material having a glass transition temperature that is lower than that of the data storage medium, an indentation mark may be produced in the data storage medium by the application of less heat and/or force to the tip than if the support layer did not exhibit this property.

According to an embodiment of a second aspect of the present invention, there is provided a method of producing a data storage device comprising a data storage medium for storing data in the form of topographic features, the method comprising the step of: forming the data storage medium on a support layer having a lower shear modulus than the data storage medium.

Desirably, in the step of forming the data storage medium on the support layer, surface energy-driven phase separation is used. Since the data storage medium and the support layer do not have to be made in separate steps, ease of fabrication is facilitated.

Alternatively, the step of forming the data storage medium on the support layer may comprise the steps of: a) depositing the data storage medium onto at least a part of a hydrophilic surface; b) depositing the support layer onto an exposed surface of the data storage medium deposited in step (a), thereby to obtain a modified hydrophilic surface; c) clamping the modified hydrophilic surface produced in step (b) with a target surface thereby to obtain an assembly; and d) transferring the support layer with the data storage medium thereon onto at least an adjacent region on the target surface by introducing a solvent to an environment of the assembly obtained in step (c). In this case, the hydrophilic and hydrophobic character of specific materials is exploited for the deposition of the data storage medium onto the support layer, the data storage medium having a reduced surface roughness compared to what is obtained with previously-proposed techniques such as spin coating. Furthermore, complicated processing equipment and/or steps are not required.

Any of the device features may be applied to the method aspect of the invention and vice versa. Advantages of the device features apply to corresponding method features and vice versa.

DESCRIPTION OF THE DRAWINGS

Reference will now be made, by way of example, to the accompanying drawings, in which:

FIG. 3 shows a depth of an indentation mark formed in a polymer layer deposited on a silicon substrate plotted as a function of an average height of a rim formed around the opening of the indentation mark, this being done for different thicknesses of the polymer layer and for the case that the indentation mark was formed with a tip whose corresponding heater was heated to a temperature of about 100.degree. C.

DETAILED DESCRIPTION OF THE INVENTION

Figure 1A:
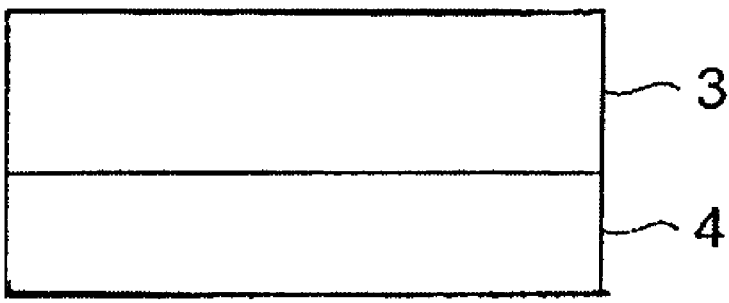
FIGS. 1a and 1b (as described above) show examples of previously-proposed devices.
Figure 1B:
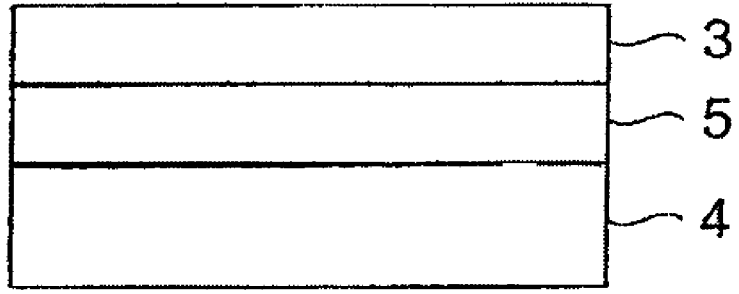

Within the description, the same reference numerals or signs are used to denote the same parts or the like.

Figure 2:
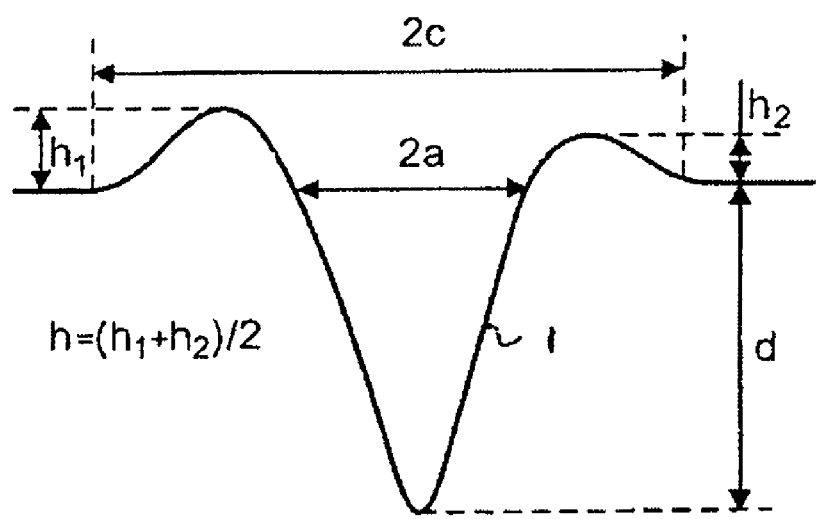
FIG. 2 schematically illustrates a typical profile of an indentation mark.

As described above, bits are encoded in a data storage medium comprising a polymer layer in the form of indentation marks, each representing a logical "1", and non-indentation marks, each representing a logical "0". By way of example, FIG. 2 schematically illustrates a typical profile of an indentation mark 1 formed in a polymer layer. As can be seen from FIG. 2, the indentation mark 1 is a trough formed in the polymer layer having a depth d and inner diameter 2a. Polymer material that is displaced during formation of the indentation mark 1 is deposited in the region surrounding the opening of the indentation mark 1, thereby to form a rim. Displacement of the polymer material typically occurs in a non-uniform manner. In this case, the rim profile would be asymmetric, this being depicted in FIG. 2 by way of the respective heights h1 and h2 of the rim formed around the opening of the indentation mark 1 being different. The average height h of the rim can be taken to be: $h \approx (h1+h2)/2$. As can be seen from FIG. 2, the effective diameter 2c of the indentation mark 1 including the rim is greater than the inner diameter 2a of the indentation mark 1. Thus, formation of the rim may influence the profile of adjacent indentation marks 1, this particularly being the case when an average lateral extension of the rim is comparable to the distance between adjacent indentation marks 1. The overlap of rims formed around adjacent indentation marks, which may be undesirable from the perspective of data storage density and of differentiating the adjacent indentation marks during a read operation, depends on the average height h of a rim with respect to the depth d of the indentation mark 1 around which it is formed.

Figure 3A:
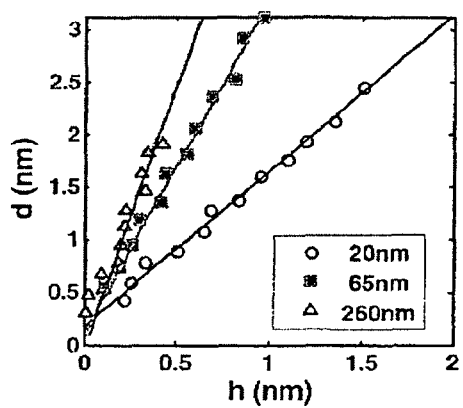
(FIG. 3a) and about 350° C.
Figure 3B:
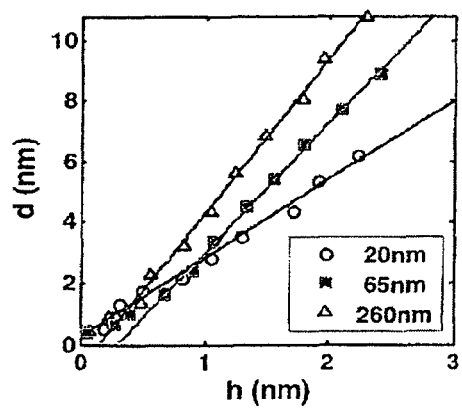
(FIG. 3b), respectively.

In order to determine the relationship between rim formation around an indentation mark 1 and the thickness of the polymer layer in which the indentation mark 1 is formed, indentation marks of varying depth d were formed in a polymer comprising polystyrene-r-benzocyclobutene 30% random copolymer, PS-30%-BCB, deposited on a silicon substrate, for different thicknesses, 20 nm, 65 nm and 260 nm, respectively, of the PS-30%-BCB layer. The results obtained for when the indentation marks were formed with a heated tip whose corresponding heater was heated to a temperature of about 100° C. is shown in FIG. 3a. In FIG. 3b, the results obtained for a heated tip whose corresponding heater was heated to a temperature of about 350° C. are shown.

As can be seen from FIGS. 3a and 3b, the average height h of the rim formed around the opening of the indentation mark 1 increases for an increasing depth d of the indentation mark and that this relationship is demonstrated for the different thicknesses, 20 nm, 65 nm and 260 nm, of the polymer layer that were used in the investigation. As can be seen from FIGS. 3a and 3b, as the thickness of the polymer layer is reduced, the average height h of the rim formed around the opening of the indentation mark 1 increases for a given depth d of the indentation mark. For example, it can be seen from FIG. 3a where the heater corresponding to the tip used in the formation of the indentation mark 1 was heated to a temperature of about 100° C. that, for a depth d of 3 nm for the indentation mark 1, the average height h of the rim was approximately 0.6 nm for a polymer layer thickness of 260 nm, 0.9 nm for a polymer layer thickness of 65 nm and 2 nm for a polymer layer thickness of 20 nm. From FIG. 3b, where the heater corresponding to the tip used in the formation of the indentation mark 1 was heated to a temperature of about 350° C., it can be seen that, for a depth d of 3 nm for the indentation mark 1, the average height h of the indentation mark 1 was approximately 0.7 nm for a polymer thickness of 260 nm, 1 nm for a polymer thickness of 65 nm and 1.1 nm for a polymer thickness of 20 nm.

The results shown in FIGS. 3a and 3b, which were obtained for PS-30%-BCB deposited on a silicon substrate 4, would also be expected for other previously-proposed data storage devices where a polymer layer is deposited on a substrate/layer having a comparably higher shear modulus than the material of the polymer layer. In this case, thickness values of the polymer layer making up the data storage medium 3 are typically chosen to be >80 nm since, and as can be seen from the results shown in FIGS. 3a and 3b, rim formation around indentation marks formed in such a polymer layer would be less than if its thickness value were further reduced.

FIGS. 3a and 3b show that, even though the depth d of an indentation mark 1 is less than the thickness of the polymer layer by more than an order of magnitude, the mechanical stress field that results in the polymer layer when the indentation mark 1 is formed thereon by way of a tip and which causes rim formation, extends much further into the polymer layer than the depth d of the indentation mark 1 that is formed since a rim that has an average height h that is approximately of the same order of magnitude as the depth d of the indentation mark 1 is formed around the opening thereof. Furthermore, the results of FIGS. 3a and 3b show that this effect is further enhanced when the thickness value of the polymer layer is further reduced since the average height h of the rim formed around an indentation mark 1 of a given depth d increases as the thickness of the polymer layer is reduced.

Figure 4:
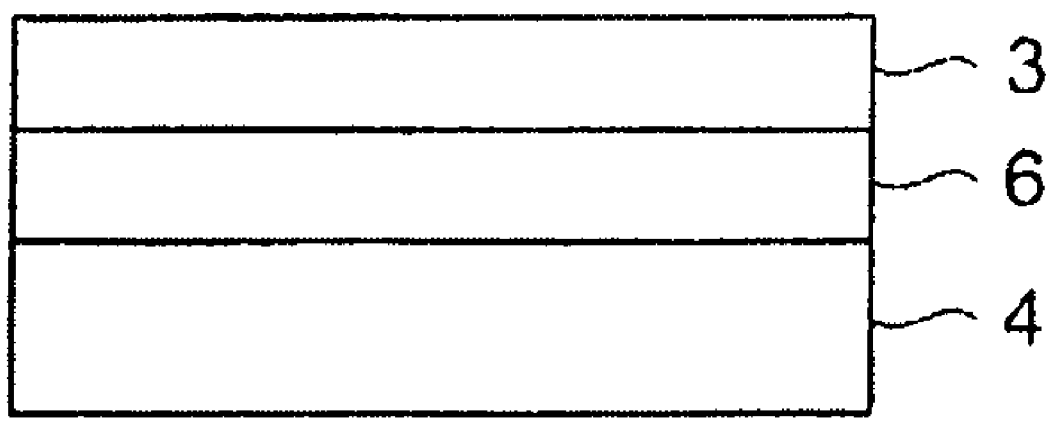
FIG. 4 shows an embodiment of the present invention.

FIG. 4 shows an embodiment of the present invention, which comprises a data storage medium 3 for storing data in the form of topographic features. The topographic features comprise indentation marks 1 and non-indentation marks. The indentation marks 1 are formed on the data storage medium 3 and/or sensed by using the tip of at least one probe (not shown). The data storage medium 3 is formed on a support layer 6, the material of which is chosen to have a lower shear modulus than that used for the data storage medium 3. The support layer 6 may be formed on a silicon substrate 4. When an indentation mark 1 is formed on the data storage medium 3, the mechanical stress field that is created is absorbed by the support layer 6 by virtue of the latter having a lower shear modulus than the data storage medium 3. Accordingly, since the back-action of the mechanical stress field is, in this case, reduced, rim formation around an opening of an indentation mark 1 is reduced compared to what is obtained with previously-proposed data storage devices.

The data storage medium 3 comprises a polymer material. In an embodiment of the present invention, poly-aryletherketone, PAEK, is used for this purpose since it demonstrates stability when exposed to elevated temperatures such as, for example, those used to write data in the above-described manner. However, the present invention is not limited to the use of PAEK for the data storage medium 3 and any polymer material that is able to sustain the temperatures used during the write process and that has a higher shear modulus value than the support layer 6 may be used. In this regard, PAEK has a shear modulus of about 3 to 5 GPa.

The support layer 6 is chosen to exhibit the property that it has a shear modulus of <1 GPa. By using a support layer 6 that has a shear modulus that is <1 GPa, the mechanical stress field that is created in and around the region of the data storage medium 3 that is contacted by a tip when data is written thereon, is transmitted and spread in the support layer 6 in a direction parallel to the surface of the data storage medium over a region that is much wider than the tip diameter. Thus, the back-action of the mechanical stress field is reduced and so the formation of a rim around an indentation mark 1 is also reduced compared to previously-proposed data storage devices.

In an embodiment of the present invention, the thickness of the data storage medium 3 is chosen to be at least 5 nm. When it is chosen to be in the range of 5 nm to 20 nm, the proximity of the tip that is used in the production of an indentation mark 1 in the data storage medium 3 relative to the support layer 6 is increased than if a thicker layer were used for the data storage medium 3. In this case, the mechanical stress field is absorbed more by the support layer 6, rather than material of the data storage medium 3 at an increasing depth in the axis of tip penetration which would be the case for thicker layers of the data storage medium 3, and, thus, rim suppression would be expected to be enhanced. Other advantages to be gained by using such thickness values for the data storage medium 3 are that less material of the data storage medium 3 which, in an embodiment of the present invention has a higher shear modulus and a higher glass transition temperature than that of the support layer 6, has to be deformed in the formation of an indentation mark 1 and would not have to be heated up to the temperatures that are required for formation of indentation marks 1 in thicker polymer layers, i.e. >20 nm.

The data storage medium 3 is designed so as to be stable during a read process when the indentation marks 1 thereon are sensed by operation of the probe in contact-mode (as hereinbefore described), the tip of the probe having a radius of approximately 5 nm and the probe being subjected to a load of <50 nN. The data storage medium 3 is also designed so as to provide storage of the mechanical stress field that satisfies the criteria of an indentation mark 1 being retained in the data storage medium 3 but also that it can be subsequently erased if so required.

In an embodiment of the present invention, the support layer 6 comprises a polymer material having a glass transition temperature that is lower than room temperature. Since the viscosity of the polymer material used for the support layer 6 has a glass transition temperature lower than room temperature, it would react to the mechanical stress field created in the data storage medium 3, when an indentation mark 1 is formed thereon by way of a tip, by yielding and/or flowing. Accordingly, the back-action of the mechanical stress field and the formation of a rim around the indentation mark 1 would be reduced. In this case, the polymer material may comprise cross-linked rubbers, for example, polyisoprene, polybutadiene, poly(ethylene-r-propylene) or poly-dimethylsiloxane.

In another embodiment of the present invention, the support layer 6 comprises a polymer material having a glass transition temperature >60° C. In this case, the support layer 6 is chosen so as to comprise a polymer material having a glass transition temperature lower than that of the data storage medium 3. The support layer 6 mechanically deforms when an indentation mark 1 is produced in the data storage medium 3. The support layer 6 is able to preserve its mechanically deformed state at room temperature, which is the temperature at which an embodiment of the present invention may be typically operated, by virtue of being made up of a polymer material having a glass transition temperature >60° C. Furthermore, the support layer 6 is chosen so as to comprise a polymer material having a glass transition temperature lower than that of the data storage medium 3. When an indentation mark 1 is formed in the data storage medium 3, the data storage medium 3 where contacted by the tip and an underlying region in the support layer 6 are deformed. The heat and/or force used to produce the indentation mark 1 by way of the tip depend on the glass transition temperature of the data storage medium 3 and the support layer 6, respectively. In an embodiment of the present invention, since the support layer 6 is chosen so as to comprise a polymer material having a glass transition temperature that is lower than that of the data storage medium 3, an indentation mark 1 may be produced in the data storage medium 3 by the application of less heat and/or force to the tip than if the support layer 6 did not exhibit this property.

According to an embodiment of a second aspect of the present invention, there is provided a method of producing a data storage device comprising a data storage medium 3 for storing data in the form of topographic features, the method comprising the step of: forming the data storage medium 3 on a support layer 6 having a lower shear modulus than the data storage medium 3. In this case, the topographic features stored on the data storage medium 3 may be read and/or written by the tip of at least one probe.

In an embodiment of the present invention, surface energy-driven phase separation is used in the step of forming the data storage medium 3 on the support layer 6. In surface energy driven phase separation, the respective surface energies of two components determines what surfaces they segregate to. In an embodiment of the present invention where surface energy driven phase separation is used in the step of forming the data storage medium 3 on the support layer 6, at least two components are provided, one of the at least two components being the data storage medium 3 and the other of the at least two components being the support layer 6. The support layer 6 is chosen so as to segregate to, for example, the silicon substrate 4 whereas the data storage medium 3 is chosen so as to segregate and to form a surface of the data storage device with respect to which the tip of a probe may interact, for example. If PAEK is used for the polymer material of the data storage medium 3, a more polar polymer layer may be used for the support layer 6, for example, polymethylacrylate.

An advantage associated to the use of surface energy-driven phase separation is that the data storage medium 3 and the support layer 6 need not be made in separate steps. The materials that are respectively used for the data storage medium 3 and the support layer 6 may be mixed and deposited onto, for example, a silicon substrate 4. The data storage medium 3 and the support layer 6 would then spontaneously separate in the above-described manner.

In another embodiment of the present invention, the method disclosed in the unpublished European patent application, EP06112078.8, which is assigned to the applicant, is used in the step of forming the data storage medium 3 on the support layer 6. The entire content of the unpublished European patent application, EP06112078.8, is incorporated herein by reference. In a step (a), the data storage medium 3 may be deposited by spin-coating a layer of polymer material onto at least a part of a hydrophilic surface. The polymer material may, for example, be a layer of PAEK of approximately 10 nm thickness and the hydrophilic surface may, for example, be a mica substrate. In a step (b), the support layer 6 is deposited onto an exposed surface of the data storage medium 3 that was deposited in step (a), thereby to obtain a modified hydrophilic surface. This may be done by, for example, spin-coating a cross-linked rubber such as polystyrene at a thickness value of approximately 100 nm onto the exposed surface of the data storage medium 3. In a step (c), the modified hydrophilic surface is then clamped with a target surface, thereby to obtain an assembly. The target surface may be a surface onto which transfer of the support layer 6 with the data storage medium 3 deposited thereon is desired and could, for example, be a silicon substrate 4. Preferably, the target surface is a hydrophobic surface. In a step (d), the support layer 6 with the data storage medium 3 deposited thereon is transferred onto the target surface by introducing a solvent to the environment of the assembly. Due to the ionic surface charges of the hydrophilic surface and the non-polar nature of the hydrophobic polymer material of which the data storage medium 3 is made up of, when the solvent is introduced in an environment of the assembly, the hydrophilic surface and the data storage medium 3 spontaneously separate and the support layer 6 with the data storage medium 3 deposited thereon is transferred onto at least an adjacent region on the target surface (step (c)).

An embodiment of the present invention is not restricted to the use of a heated tip in the formation of indentation marks and an unheated tip may be used for this purpose.

Each feature disclosed in the description, and (where appropriate) the claims and drawings may be provided independently or in any appropriate combination.

The present invention has been described above purely by way of example, and modifications of detail can be made within the scope of the invention.

The invention claimed is:

1. A data storage device comprising:
   a polymeric data storage medium for storing data in the form of topographic features, wherein a thickness of the data storage medium is 5 nm to 20 nm; and
   at least one probe for writing and/or reading the data stored in the data storage medium wherein the data storage medium is formed on a support layer, the support layer having a lower shear modulus than the data storage medium.

2. A data storage device as claimed in claim 1 wherein the data storage medium comprises a layer of poly-aryletherketone, PAEK.

3. A data storage device as claimed in claim 1 wherein the shear modulus of the support layer is <1GPa.

4. A data storage device as claimed in claim 1 wherein the support layer comprises a polymer material having a glass transition temperature that is lower than room temperature.

5. A data storage device as claimed in claim 1 wherein the support layer comprises a polymer material having a glass transition temperature greater than 60° C.

6. A data storage device as claimed in claim 5 wherein the support layer comprises a polymer material having a glass transition temperature lower than that of the data storage medium.

7. A method of producing a data storage device comprising a polymeric data storage medium for storing data in the form of topographic features, the method comprising the step of:
   forming the polymeric data storage medium on a support layer having a lower shear modulus than the data storage medium, wherein a thickness of the polymeric data storage medium is 5 nm to 20 nm.

8. A method of producing a data storage device as claimed in claim 7 wherein, in the step of forming the data storage medium on the support layer, surface energy-driven phase separation is used.

9. A method of producing a data storage device as claimed in claim 7 wherein, the step forming the data storage medium on the support layer comprises the steps of:
   a) depositing the data storage medium onto at least a part of a hydrophilic surface;
   b) depositing the support layer onto an exposed surface of the data storage medium deposited in step (a), thereby to obtain a modified hydrophilic surface;
   c) clamping the modified hydrophilic surface produced in step (b) with a target surface thereby to obtain an assembly; and
   d) transferring the support layer with the data storage medium thereon onto at least an adjacent region on the target surface by introducing a solvent (4) to an environment of the assembly obtained in step (c).

10. A method of producing and storing data in a data storage device comprising a data storage medium (3) for storing data in the form of topographic features, the method comprising the steps of:
   forming the data storage medium (3) on a support layer (6) having a lower shear modulus than the data storage medium (3), wherein the data storage medium is configured for storing data in the form of topographic features, has a thickness of 5 nm to 20 nm and consists essentially of a layer of poly-aryletherkeione having a shear modulus of about 3 to 5 Gpa, wherein the data storage medium is adapted for thermomechanical imprinting of the topographic features in the layer of the polyaryletherketone, and wherein the support layer comprises a polymer having a glass transition temperature less than the layer of the poly-aryletherketone in the data storage medium and has a shear modulus less than 1 Gpa, wherein the support layer having a lower shear modulus than the data storage medium; and
   thermomechanically forming an indentation mark on the layer of polyaryletherketone.

11. The method of claim 10, wherein the glass transition temperature of the support layer is greater than or equal to 60° C.

\* \* \* \* \*